United States Patent [19]

Gelinas

[11] 4,447,779

[45] May 8, 1984

[54] APPARATUS AND METHOD FOR DETERMINATION OF A RECEIVING DEVICE RELATIVE TO A TRANSMITTING DEVICE UTILIZING A CURL-FREE MAGNETIC VECTOR POTENTIAL FIELD

[75] Inventor: Raymond C. Gelinas, Concord, Mass.

[73] Assignee: Honeywell Inc., Minneapolis, Minn.

[21] Appl. No.: 198,553

[22] Filed: Oct. 20, 1980

[51] Int. Cl.³ .................... G01B 7/14; G01R 33/02
[52] U.S. Cl. ................................. 324/207; 324/244; 324/248; 324/260
[58] Field of Search ............... 324/207, 208, 244, 260, 324/252, 248

[56] References Cited

U.S. PATENT DOCUMENTS 3,983,474 9/1976 Kuipers ........................... 324/207

FOREIGN PATENT DOCUMENTS 2814551 10/1971 Fed. Rep. of Germany ...... 324/207

Primary Examiner—Gerard R. Strecker
Assistant Examiner—Walter E. Snow
Attorney, Agent, or Firm—W. W. Holloway, Jr.; L. J. Marhoefer; N. Prasinos

[57] ABSTRACT

Apparatus for determination of direction using the curl-free magnetic vector potential field. The apparatus includes apparatus for generating a predominantly curl-free magnetic vector potential field with a predetermined vector field spatial orientation. The field receiving apparatus includes a detecting apparatus with observable properties that vary with magnitude and orientation of an applied curl-free magnetic vector potential field. The apparatus can specify a direction of the field generating apparatus. A periodically rotating vector field can specify a path toward the field generating apparatus. The curl-free magnetic vector potential field can be established in conducting and opaque materials which are not capable of transmitting normal electromagnetic radiation.

8 Claims, 10 Drawing Figures

APPARATUS AND METHOD FOR DETERMINATION OF A RECEIVING DEVICE RELATIVE TO A TRANSMITTING DEVICE UTILIZING A CURL-FREE MAGNETIC VECTOR POTENTIAL FIELD

RELATED APPLICATIONS

Apparatus and Method for Transfer of Information by Means of a Curl-Free Magnetic Vector Potential Field invented by Raymond C. Gelinas, Ser. No. 198,324, filed on Oct. 20, 1980 and assigned to the same assignee as named herein.

Apparatus and Method for Distance Determination by Means of a Curl-Free Magnetic Vector Potential Field, invented by Raymond C. Gelinas, Ser. No. 198,326, filed on Oct. 20, 1980 and assigned to the same asignee as named herein.

Apparatus and Method for Demodulation of a Modulated Curl-Free Magnetic Vector Potential Field, invented by Raymond C. Gelinas, Ser. No. 198,325, filed on Oct. 20, and assigned to the same assignee as named herein.

Apparatus and Method for Modulation of a Curl-Free Magnetic Vector Potential Field, invented by Raymond C. Gelinas, Ser. No. 198,380, filed on Oct. 20, 1980 and assigned to the same assignee as named herein.

BACKGROUND OF THE INVENTION

1. Field of the Invention

This invention relates generally to the determination of direction means of an electromagnetic field, and more particularly to determination of direction of apparatus generating curl-free magnetic vector potential field.

2. Description of the Prior Art

It is known in the prior art to provide systems for the determination of a direction of a source generating electromagnetic fields which are solutions to Maxwell's equations. The direction determination system include apparatus for generating electromagnetic fields and apparatus for detecting the generated electromagnetic field. The generating and detecting apparatus can be made non-uniform with respect to spatial generation and detection of electromagnetic radiation fields. This non-uniformity can be used to determine a direction of a source. Examples of the prior type of direction transfer systems include microwave band systems and optical based systems.

The Maxwell equations, which govern the prior art transfer of information by electromagnetic systems can be written:

$$\text{CURL } \bar{E} + \frac{\partial \bar{B}}{\partial t} = 0 \qquad 1.$$

$$\text{CHRL } \bar{H} - \frac{\partial \bar{D}}{\partial t} = \bar{J} \qquad 2.$$

$$\text{DIV } \bar{B} = 0 \qquad 3.$$

$$\text{DIV } \bar{D} = \rho \qquad 4.$$

where $\bar{E}$ is the electric field density, $\bar{H}$ is the magnetic field intensity, $\bar{B}$ is the magnetic flux density, $\bar{D}$ is the electric displacement, $\bar{J}$ is the current density and $\rho$ is the change density. In this notation the bar over a quantity indicates that this is a vector quantity, i.e., a quantity for which a spatial orientatim is required for complete specification. The terms CURL, and DIV refer to the CURL and DIVERGENCE mathematical operations and are denoted symbolically by the $\nabla \times$ and $\nabla \cdot$ mathematical operations respectively. Furthermore, the magnetic field intensity and the magnetic flux density are related by the equations $\bar{B} = \mu \bar{H}$, which the electric field density and the electric displacement are related by the equation $\bar{D} = \mu \bar{H}$. These equations can be used to describe the transmission of electromagnetic radiation through a vacuum or through various media.

It is known in the prior art that solutions to Maxwell's equations can be obtained through the use of electric scalar potential functions and a magnetic vector potential function. The electric scalar potential is given by the expression:

$$\phi(1) = \frac{1}{4\pi\epsilon_o} \int \frac{\rho(2)}{r_{12}} dv(2) \qquad 5.$$

where $\phi(1)$ is the scalar potential at point 1, $\rho(2)$ is the charge density at point 2, $\sqrt{12}$ is the distance between point 1 and 2, and the integral is taken over all differential volumes. The magnetic vector potential is given by the expression $$\bar{A}(1) = \frac{1}{4\pi\epsilon_o C^2} \int \frac{\bar{J}(2)}{r_{12}} dv(2) \qquad 6.$$

where $\bar{A}(1)$ is the vector potential at point 1, $\alpha_o$ is the permittivity of free space, C is the velocity of light $\bar{J}(2)$ is the (vector) current density at point 2. $\sqrt{12}$ is the distance between point 1 and point 2 and the integral is taken over all differential volumes. The potential functions are related to Maxwell's equations in the following manner.

$$\bar{E} = -\text{GRAD } \phi - \frac{\partial \bar{A}}{\partial t} \qquad 7.$$

where GRAD is the gradient mathematical operation and is denoted symbolically by the $\nabla$ mathematical operator.

$$\bar{B} = \text{CURL } \bar{A} \qquad 8.$$

where $\bar{A}$ can contain, for completeness a term which is the gradient of a scalar function. In the remaining discussion, the scalar function will be taken to be substantially zero. Therefore, attention will be focussed on the magnetic vector potential $\bar{A}$.

In the prior art literature, consideration has been given to the physical significance of the magnetic vector potential field $\bar{A}$. The magnetic vector potential field was, in some instances, believed to be a mathematical artifice, useful in solving problems, but devoid of independent physical significance.

More recently, however, the magnetic vector potential has been shown to be a quantity of independent physical significance. Indeed, in quantum mechanics, the Schroedinger equation for a (non-relativistic, spinless) particle with charge q and mass m moving in an electromagnetic field is given by $$-\frac{\hbar}{i} \frac{\partial \psi}{\partial t} = \qquad 9.$$

-continued $$\frac{1}{2m}\left(\frac{\hbar}{i} \text{GRAD} - q\overline{A}\right)\left(\frac{\hbar}{i} \text{GRAD} - q\overline{A}\right)\psi + q\phi\psi$$

where h is Planck's constant divided by $2\pi$, i is the imaginary number $°+1$, $\phi$ is the electric scaler potential experienced by the particle, $\overline{A}$ is the magnetic scalar potential experienced by the particle and $\psi$ is the wave function of the particle. A device operating on quantum mechanical principles which can detect curl-free magnetic vector potential radiation in the Josephson junction device. It is desirable to develop a direction determination device utilizing the curl-free vector potential radiation field.

OBJECTS OF THE INVENTION

It is therefore an object of the present invention to provide an improved system for the determination of direction. It is a further object of the present invention to provide a system for the determination of direction that utilizes the curl-free magnetic vector potential field.

It is a more particular object of the present invention to provide a system for determination of direction that utilizes apparatus generating an oriented curl-free magnetic vector potential field.

It is another particular object of the present invention to provide a system for determination of direction that utilizes detection apparatus capable of determining the orientation of a curl-free magnetic vector potential field.

It is another particular object of the present invention to provide apparatus for generation of a curl-free magnetic vector potential field of pre-determined orientation and apparatus for detection of the orientation of a curl-free magnetic vector potential field. This apparatus can be utilized to establish a path for guidance for a vehicle.

SUMMARY OF THE INVENTION

The aforementioned and other objects are accomplished, according to the present invention, by apparatus for generating a magnetic vector potential field A having a substantial curl-free component (i.e., CURL A=0) and a predetermined orientation in space and a non-uniform spatial pattern. Apparatus for detecting the curl-free magnetic vector potential field and determining the vector orientation can be utilized in conjunction with the generating apparatus. The non-uniformity of the spatial magnitude of the field produced by the generating apparatus can be planar in orientation. Because in plane of maximum magnitude the curl-free magnetic vector potential field has an orientation perpendicular to the generating apparatus, the direction of the generating apparatus for detection apparatus capable of determining the vector field orientation can specify a direction to the generating apparatus. When a vector field with a rotary orientation is produced, a path for the guidance of a vehicle having a detector capable of measuring orientation and magnitude of a vector field can be determined.

Examples of the apparatus generating magnetic vector potential fields with substantial curl-free components and spatial field patterns of not uniform magnitude include solenoid configurations and toroidal configurations. The Josephson junction device is an example of a device which can detect the magnitude of a curl-free vector potential field as well as the orientation of the vector field.

These and other features of the present invention will be understood upon reading of the following description along with the drawings.

DESCRIPTION OF THE PREFERRED EMBODIMENT

1. Detailed Description of the Figures

Figure 1:
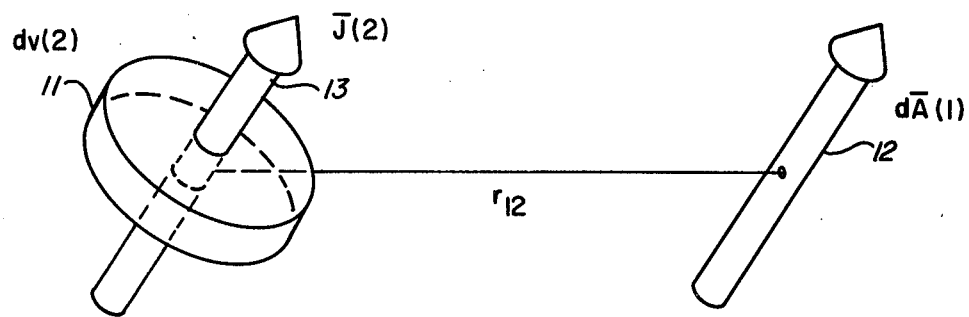
FIG. 1 is a schematic diagram illustrating the technique for determining a magnetic vector potential at a point.

Referring to FIG. 1, the method of determining the magnetic vector potential $\overline{A}(1)$ (i.e., at point 1) is illustrated. Referring to equation 6, the contribution by the differential volume element at point 2, dv(2) having a current density $\overline{J}(2)$ associated therewith is given by $$d\overline{A}(1) = \frac{1}{4\pi\epsilon_0 c^2} \frac{\overline{J}(2)}{r_{12}} dv(2) \qquad 10.$$

To obtain equation 6, equation 10 must be integrated. Equations 6 and 10 are valid where $\overline{J}$ is not a function of time.

Figure 2:
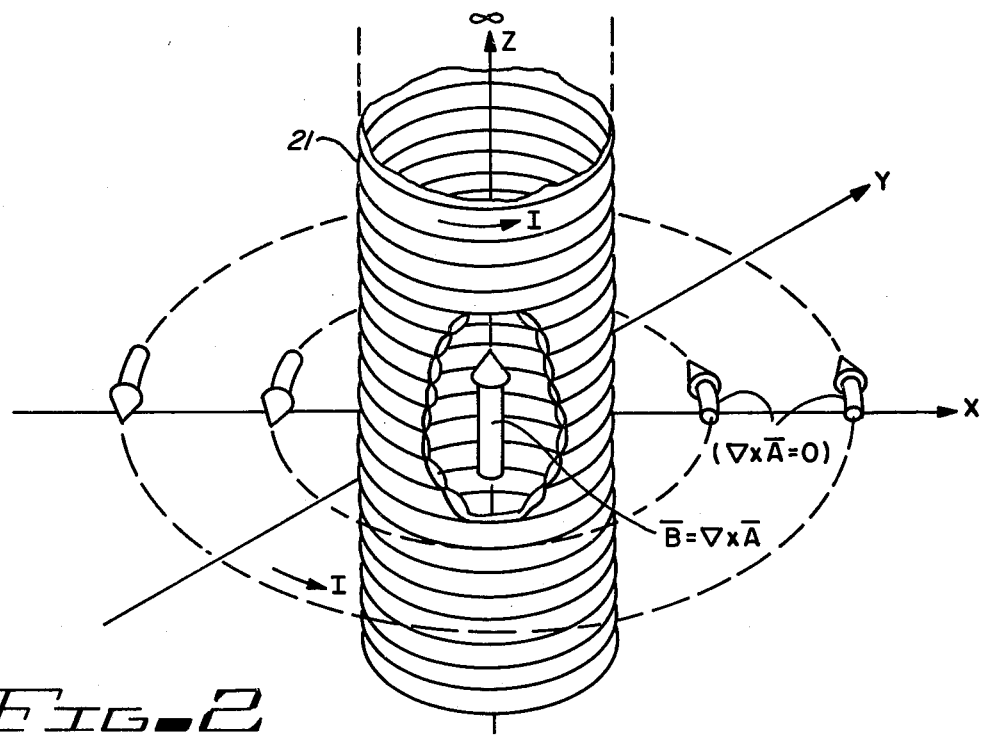
FIG. 2 is a schematic diagram illustrating the generating of a curl-free magnetic vector potential field using an infinite solenoid.

Referring to FIG. 2, an example of current configuration producing a substantial component of curl-free magnetic vector potential field is shown. Conductors carrying a current I are wrapped in a solenoid configuration 21 extending a relatively great distance in both directions along the Z-axis. With the solenoid 21 the magnetic flux density $\overline{B} = \text{CURL } \overline{A}$ is a constant directed along the Z-axis with a value $$\overline{B} = B_z = \frac{nI}{\epsilon_0 c^2} \qquad 11.$$

where n is the number of conductor turns per unit length. Outside of the solenoid, it can be shown that $$A_x = -\frac{nIa^2}{2\epsilon_o C^2} \frac{y}{x^2 + y^2} \qquad 12.$$

$$A_y = \frac{nIa^2}{2\epsilon_o C^2} \frac{x}{x^2 + y^2} \qquad 13.$$

$$A_z = 0 \qquad 14.$$

where a is the radius of the solenoid. It can be shown that CURL $\overline{A}=0$ for the vector potential field.

Figure 3:
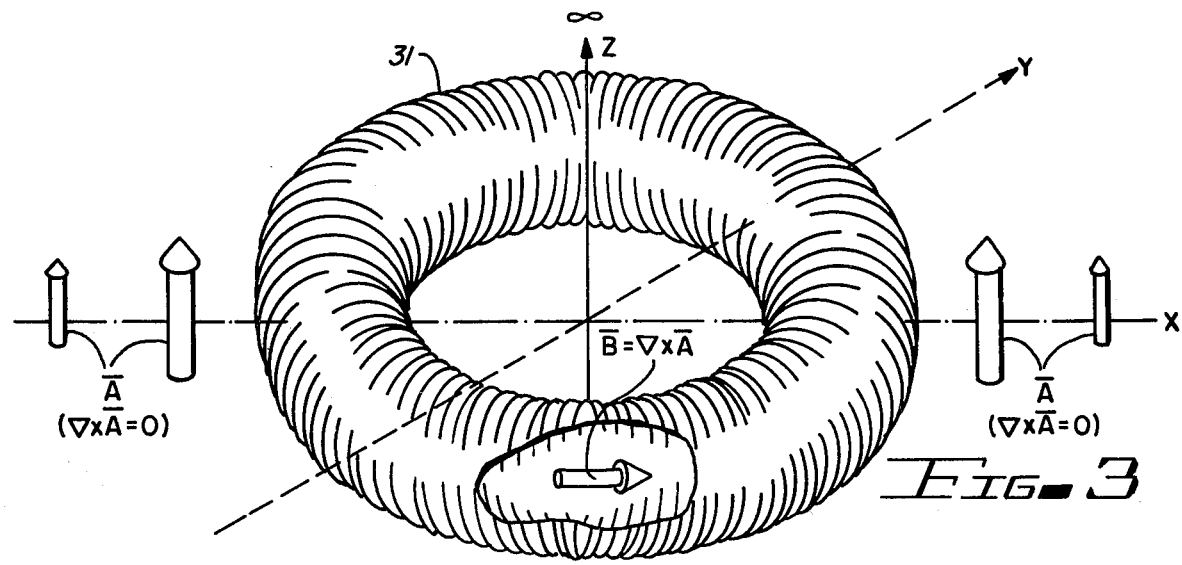
FIG. 3 is a schematic diagram illustrating the generation of a curl-free magnetic vector potential field using a toroidal configuration.

Referring to FIG. 3, another example of a current geometry generating magnetic vector potential field with a substantial curl-free component is shown. In this geometry the current carrying conductors are wrapped uniformly in toroidal configuration 31. Within the toroidal configuration, the magnetic flux $\overline{B}=$CURL $\overline{A}$ and the magnetic flux is contained substantially within the torus. In the region external to the torus, $\overline{B}=$CURL $\overline{A}=0$ and the orientation of the magnetic vector potential field is along the axis of the torus.

Figure 4A:
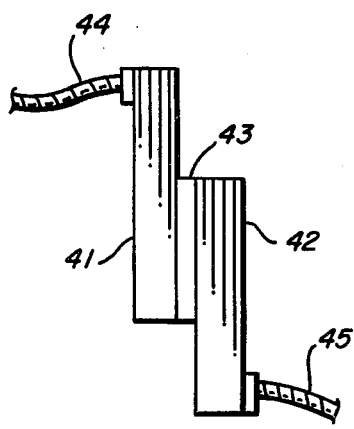
FIG. 4A is a cross-sectional diagram of a Josephson junction.
Figure 4B:
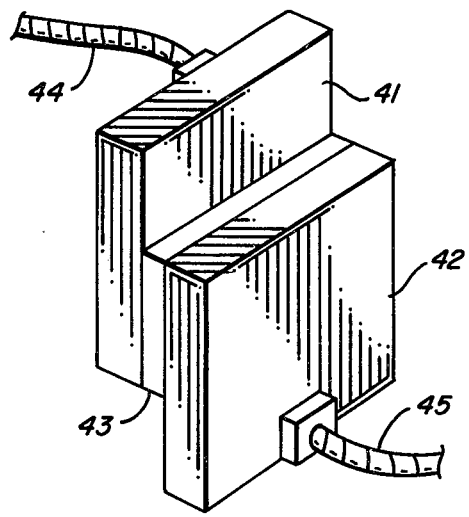
FIG. 4B is a perspective view of a Josephson junction.

Referring to FIG. 4a and FIG. 4b, a detector capable of detecting the curl-free component of the magnetic vector potential field is shown. This detector is referred to as a Josephson junction device. The Josephson junction consists of a first superconducting material 41 and a second superconducting material 42. These two superconducting materials are separated by a thin insulating material 43. The Josephson junction is coupled to external apparatus through leads 44 and 45. According to classical electromagnetic theory, the insulating material 43 will prevent any substantial conduction of electrons between the two superconducting regions. However, quantum theory predicts, and experiments verify that conduction can take place through the insulating material. The result of this conduction is a net current $$I_{JJ} = K \sin\left(\delta_o - \frac{2e}{\hbar} \int \overline{A} \cdot d\overline{s} + \frac{e}{\hbar} Vt\right) \qquad 15.$$

where the magnitude of the current K and the phase $\delta_o$ are determined by intrinsic properties of the junction device, e is the charge of the election, $\overline{A}$ is an externally applied magnetic vector potential, $d\overline{s}$ is a differential element extending from one superconducting element to the other superconducting element and V is an externally applied voltage.

Figure 5:
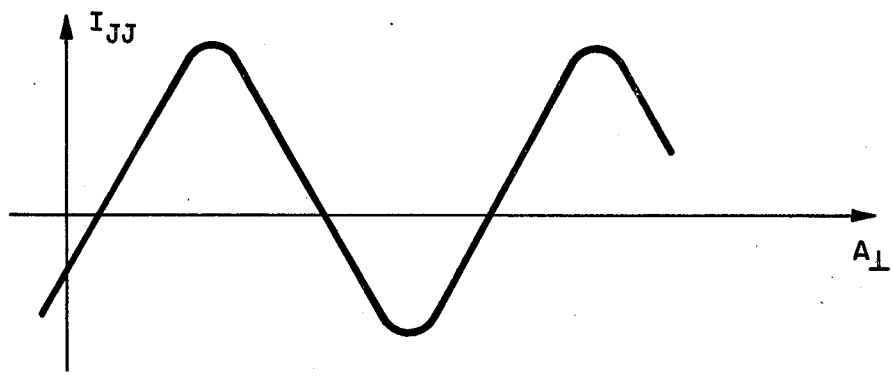
FIG. 5 is a diagram of the current flowing in a Josephson junction as a function of field perpendicular to the junction surface.

Referring to FIG. 5, the relationship of the Josephson junction device current as a function of externally applied magnetic vector potential field is shown. From equation 6, the curl-free magnetic vector potential field will be a function of the current. Thus modulating the current producing the field will result in modulation of the field. The integral $\int \overline{A} d\overline{s}$ as $\overline{A}$ is increased results in a change of phase for $I_{JJ}$. This change in phase produces the oscillating behavior for $I_{JJ}$ as a function of magnetic vector potential field perpendiculr to the Josephson junction. This relationship will hold as long as there is no externally applied voltage to the Josephson junction (i.e., V=0).

Figure 6:
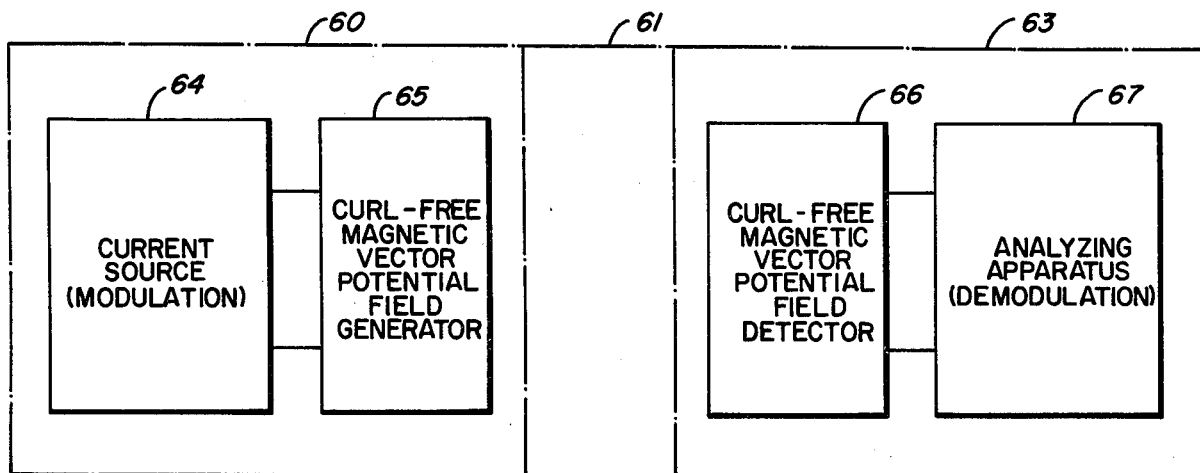
FIG. 6 is a schematic diagram of a system for using a curl-free vector potential radiation field for transmission of information.

Referring next to FIG. 6, a system for the transfer of information using a curl-free vector potential field is shown. Apparatus 60 a modulating device is comprised of a current source 64 and apparatus field generator 65, configured to generate a magnetic vector potential field having a substantial curl-free component using the current from the current source 64, Because of the relationship of the curl-free magnetic vector potential field and the originating current, modulating the current source producing the vector potential field will modulate the field inself. The magnetic vector potential field is established in the intervening media 61 and impinges upon a magnetic vector potential field detector 66. The property of detector 66 indicating the presence of a magnetic vector potential field is analyzed in apparatus 67 for information content and/or magnitude. For determining the relative amplitude of the signals impinging on the three Josephson junctions, the junctions and associated analyzer circuits must be either calibrated or balanced.

Figure 7:
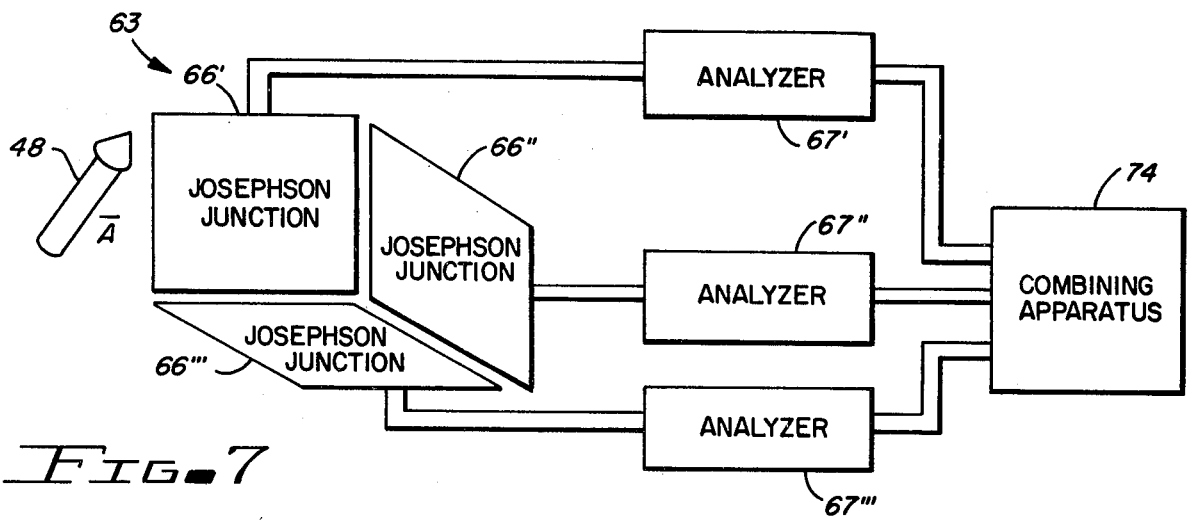
FIG. 7 is a schematic diagram of a group of Josephson junction devices and related apparatus which can determine the spatial orientation for a curl-free vector potential field.

Referring to FIG. 7, an arrangement of Josephson junction device is schematically illustrated which allow the spatial orientation of curl-free magnetic vector potential $\overline{A}$ 48 to be determined. Three Josephson junction devices and associated apparatus 63 are utilized. The three Josephson junctions are oriented so that no two are in the same plane. In the preferred embodiment the planes of the Josephson junctions are mutually perpendicular. In the analyzing apparatus, the magnitude of the vector field is determined. However, because only the component perpendicular to the junction influences this phase of the device, the value of the vector potential field determined by each analyzing circuit is in fact one of the three components of the vector field. By combining the three components, the spatial orientation of the vector potential field can be determined. This vectoriat combining can be performed in combining apparatus 74.

Figure 8:
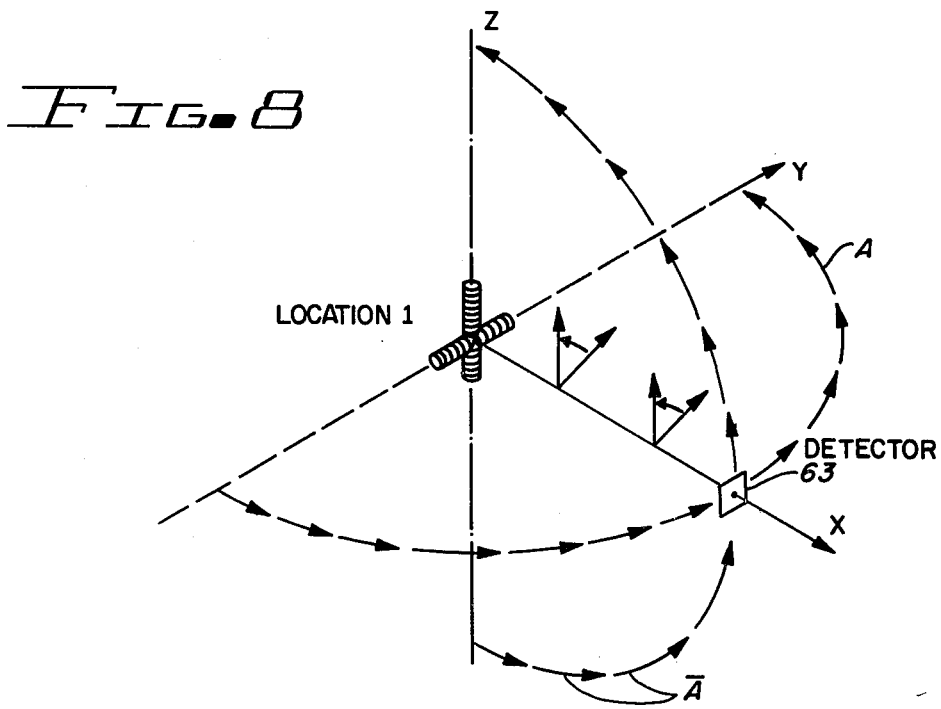
FIG. 8 illustrates how a curl-free magnetic vector potential field rotating in space can establish a line.

Referring next to FIG. 8, the procedure for establishing spatially rotary curl-free vector potential fields is shown. Field generating apparatus is placed in location 1. The apparatus consists for example of mutually perpendicular solenoids. A sine wave current is introduced into each solenoid approximately 90° out of phase with the current of the other solenoid. The detector 63 will see a rotating vector field. However, because of this characteristic, should the receiver move off of the line formed by the intersection of the planes through the solenoid, a more elliptical field pattern will be observed. Thus the detecting apparatus can determine when the apparatus itself is on the path line.

Figure 9:
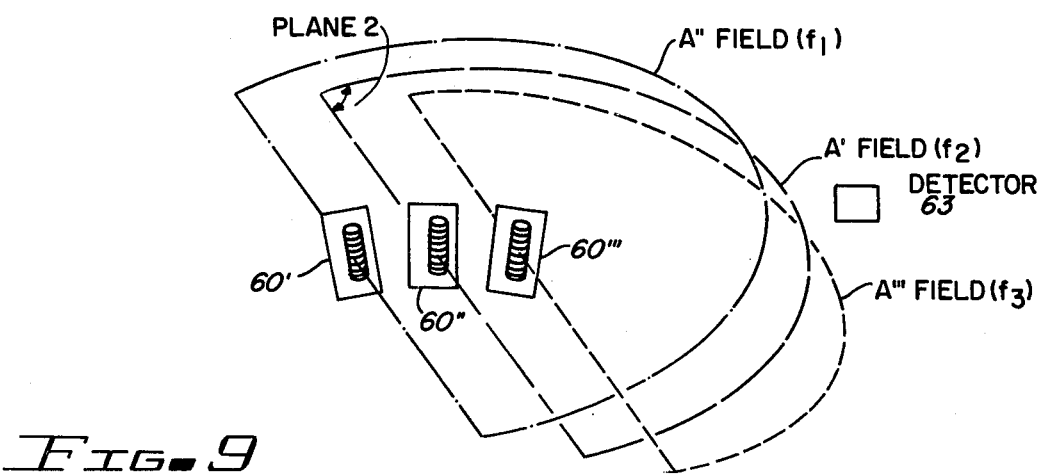
FIG. 9 illustrates how a group of directional curl-free magnetic vector potential fields can be utilized to determine a path to field generating apparatus.

Referring to FIG. 9, a path plane can be established by having three field generating apparatus (e.g., solenoids) rotate at slight angles for the other two field generating devices 60', 60" and 60'". By modulating the three solenoids with different frequencies, the detecting apparatus 63 can determine when the detection apparatus 63 is above or below plane 2. In addition, the spatial orientation of the vector field in plane 2 can identify a direction to the generating apparatus.

2. Operation of the Preferred Embodiment

In order to determine direction of a field generating apparatus it can be necessary to vary the curl-free magnetic vector potential field. No mention has been made in the previous discussion of the effect of varying the current source. It will be clear that the finite field propagation velocity will cause a delay between a change in the curl-free vector potential field produced by the generator of the field and the detection of that change by the detector located at a distance from the generator. However, these delay effects are not important for practicing the prior art invention and will be ignored in this discussion. With respect to curl-free vector potential field generating apparatus, any limitation on the upper limit of generated frequency components imposed will be the result of parameters impacting rapid changes in the current. Thus parameters such as inductance can provide a limit to ability to impose high frequency modulation on the vector potential field.

With respect to the media between the field generating apparatus and the field detecting apparatus, two effects are important. First as implied by equation (1)

$$\text{CURL } \bar{E} + \frac{\partial \bar{B}}{\partial t} = \quad\quad 16.$$

$$\text{CURL } \bar{E} + \text{CURL } \frac{\partial \bar{A}}{\partial t} = \text{CURL}\left(\bar{E} + \frac{\partial \bar{A}}{\partial t}\right) = 0$$

or $$\frac{\partial \bar{A}}{\partial t} = \bar{E} \quad\quad 17.$$

Therefore as modulation is imposed on the vector potential field, the change in the vector potential field will produce an electric field intensity. The electric field intensity will produce a flow of current in conducting material or a temporary polarization in polarizable material. With respect to materials demonstrating magnetic properties, the bulk magnetic properties are responsive to the magnetic flux density $\bar{B}$. However, $\bar{B} = \text{CURL } \bar{A} = 0$ for the curl-free vector potential field component. Therefore, the interaction of the curl-free magnetic vector potential field is weaker in magnetic materials than is true for the general magnetic vector potential field.

Media effects and especially the conductivity of the intervening media will provide a mechanism delaying the achievement of steady state condition for the curl-free magnetic vector potential field (i.e. because $$\frac{\partial \bar{A}}{\partial t} = -\bar{E})$$

and thus causing a media limitation on frequency. A curl-free magnetic vector potential field can be established in materials that are not capable of transmitting normal electromagnetic radiation. The media delay problem can be compensated for by lowering the frequency spectrum of the modulation on the curl-free vector magnetic vector potential field.

With respect to the detector, the Josephson junction can be constructed to provide responses of sufficiently high frequency so that this element of the system is not typically a factor limiting frequency of information transfer.

As indicated in equation 15, the effect of the application of a vector potential field to a Josephson junction, in the absence of a voltage applied to the junction, is to change the phase of the sine function determining the value of the junction current Ijj. The excursions from zero magnetic vector potential field can be analyzed and a determination made of the modulation applied to the field. When a voltage is applied to the Josephson junction, oscillation occurs in the Ijj as will be seen from the Vdt term of equation 15. The application of an external vector potential field causing the phase of the oscillation to change. By monitoring the phase change in the Josephson junction oscillations, the modulation of the vector potential field can be inferred.

Another method of detection of a magnetic vector potential field utilizes the property that $$\frac{\partial \bar{A}}{\partial t} = -\bar{E}.$$

Thus, for example, by measuring the changes in a material resulting from the application of the electric field, the magnetic vector potential field causing the electric field can be inferred.

In order to determine the direction of apparatus generating a curl-free magnetic vector potential field, it can be necessary to determine the orientation of the field. Because the Josephson junction is determined by the field perpendicular to the plane of the junction, three Josephson junctions will be necessary to specify the orientation (±180°). Because the relative amplitude of the vector potential field can be determined for the three orthogonal Josephson junctions 66', 66'' and 66''', the original direction cosines of the vector potential field can be determined, indicating when the field-producing current configuration is known, the direction of the curl-free magnetic vector potential field producing apparatus relative to the detecting apparatus.

If a rotating field is established which defines a line to the generating apparatus, the three Josephson junction detecting apparatus can be used to determine if the detecting apparatus is still aligned with the rotating field. It will be clear that single Josephson junction detection apparatus can be rotated in space and can replace the detecting apparatus having a plurality of Josephson junctions.

The curl-free vector potential field generating apparatus can have a maximum magnitude in a planar region. The field generating apparatus can be rotated and the field detecting apparatus can establish, by means of determination of the vector field orientation when the vector field is the maximum, the direction to the field generating apparatus. This technique can be used when apparatus for generating plurality of planar fields, having single origin but separated by a small angle, are used to establish a path. By modulating the fields differently, an operator of a vehicle can determine once in the correct plane, if he has inadvertently left the correct plane.

Many changes and modifications in the above-described embodiment of the invention can, of course, be carried out without departing from the scope thereof. Accordingly, the scope of the invention is intended to be limited only by the scope of the accompanying claims.

What is claimed is:

1. Apparatus for determining a direction between a first location and a second location comprising:
   a source of radiation positioned at said first location and providing a substantial curl-free magnetic vector potential field;
   a plurality of means at said second location for detecting said curl-free magnetic vector potential field, each of said plurality of means for detecting responsive to a component of said curl-free magnetic vector potential field having predetermined spatial orientation with respect to components detected by remaining ones of said plurality of means for detection; and means coupled to said plurality of means for detecting for determining an orientation of said vector field from said spatial orientation of said components.

2. The direction determining apparatus of claim 1 wherein an orientation plane of maximum amplitude of a curl-free magnetic vector potential field generated by said source of radiation is rotated as a preselected function of time, and wherein said detecting means can determine a maximum amplitude of said vector field as a function of time.

3. Apparatus for determining a direction between a first location and a second location comprising:
   a plurality of curl-free magnetic vector potential field sources located at said first location; each of said sources generating a curl-free magnetic vector potential field in a plane with a periodic modulation, wherein said plurality of sources generating curl-free magnetic vector potential fields are activated with a predetermined shift in phase of said periodic modulation, said predetermined shift in phase causing said sources to produce a rotating curl-free magnetic vector potential field; and
   detecting means at said second location for determining a spatial orientation of curl-free magnetic vector potential field, said detecting means demodulating said rotating curl-free magnetic vector potential field modulation into components of said rotating field, said rotating field components providing a direction from said second location to said first location.

4. Apparatus for determining a direction between a first and a second location comprising:
   two curl-free magnetic vector potential field generating means at said first location modulated at a preselected frequency, said frequency of each of said field generating means phase-shifted with respect to said frequency of said other field generating means, and providing a roating curl-free magnetic vector potential field along a predetermined line; and detecting means at said second location for determining magnitude and orientation of said rotating field, said detecting means determining a displacement from said line.

5. The apparatus of claim 4 wherein said detecting means includes a plurality of Josephson junction devices.

6. The apparatus of claim 5 where said Josephson junction devices are positioned, with respect to other Josephson junction devices to detect a component of said magnetic vector potential field perpendicular to components of said magnetic vector potential field detected by said other Josephson junction devices.

7. Apparatus for determining a deviation from a preselected spatial plane comprising:
   a first curl-free magnetic vector potential field generating means, modulated at a first frequency, a maximum amplitude of a curl-free magnetic vector potential field generated by said first field generating means substantially coincident with said preselected spatial plane;
   a second curl-free magnetic vector potential field generating means modulated with a second frequency; a maximum amplitude of a curl-free magnetic vector potential field generated by said second field generating means in a plane lying in a first direction from said preselected spatial plane;
   a third curl-free magnetic vector potential field generating means modulated with a third frequency, a maximum amplitude of a curl-free magnetic vector potential field generated by said third field generating means having a maximum amplitude in a plane lying in a second direction from said preselected spatial plane; and
   detecting means for detecting a modulated curl-free magnetic vector potential field, wherein detection of said second or said third frequency greater in amplitude than said first frequency determines a direction to said preselected spatial plane.

8. The apparatus for determining a departure from a preselected spatial plane of claim 7 wherein said first, said second and said third field generating means are a single field generating means operating in three modes, each mode having a one of said frequencies and a corresponding spatial orientation associated therewith.

* * * * *